United States Patent Office.

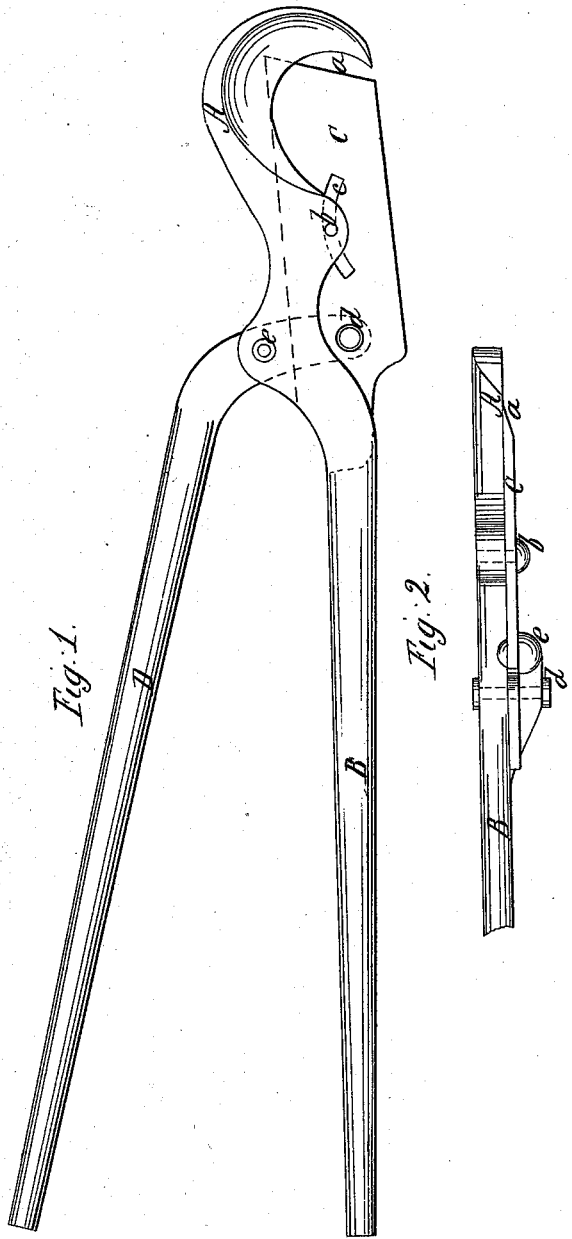

D. B. SEELEY, OF PORTLAND, ILLINOIS.

Letters Patent No. 87,436, dated March 2, 1869.

IMPROVEMENT IN PRUNING-SHEARS.

The Schedule referred to in these Letters Patent and making part of the same

*To all whom it may concern:*

Be it known that I, D. B. SEELEY, of Portland, in the county of Whitesides, and State of Illinois, have invented a new and useful Improvement in Pruning-Shears; and I do hereby declare that the following is a full, clear, and exact description thereof, which will enable others skilled in the art to make and use the same, reference being had to the accompanying drawings, forming part of this specification, in which—

Figure 1 is a side view of my invention.

Figure 2 is an edge view of the same.

Similar letters of reference indicate like parts.

This invention relates to a new and improved implement for pruning plants, bushes, trees, &c., and it consists in the peculiar construction of the same.

In the accompanying sheet of drawings—

A represents a hook-shaped blade, which is permanently attached to or formed on the end of one of the handles, B, of the implement.

C represents a sliding blade, the cutting-edge, *a*, of which is made at its outer end, said edge being made somewhat oblique, as shown clearly in fig. 1, in order to obtain a drawing cut.

This sliding blade is secured to the fixed blade by means of a screw, *b*, which passes through a curved slot, *c*, in C, and into the fixed blade.

To the inner end of the sliding blade C, the other handle, D, of the implement is connected, by a screw, or rivet, *d*. This handle D is curved at its outer part, and it is attached to the fixed blade A by a screw, or rivet, *e*, which passes through the curved end of handle D, at the point shown clearly in fig. 1.

The sliding blade C is operated from the handle D, and as the latter works from a centre or pivot *e*, the blade C does not work directly forward and backward, but has a curved movement, hence the necessity for the curved slot *c*. The cutting-edge of the blade C works past the cutting-edge of the fixed blade A.

The invention is extremely simple in construction, and may be manufactured at a reasonable cost.

I am aware of the patents granted to S. O. and P. W. T. Vaughn, December 12, 1865, G. F. Walters, November 22, 1864, and L. M. Harris, March 14, 1865, but my invention, I claim, is an improvement upon these, in its much greater simplicity, economy, and efficiency.

Having thus described my invention,

I claim as new, and desire to secure by Letters Patent—

The pruning-knife, constructed as described, of the hook-shaped blade A, on the handle B, provided at its centre with the pin *b*, the short blade C, hung by its curved slot *c* upon said pin, and the curved handle D, pivoted at *e* to the hook A, and at its end, *d*, to the inner end of the blade C, all arranged and operating as described, for the purpose specified.

The above specification of my invention signed by me, this 15th day of July, 1868.

D. B. SEELEY.

Witnesses:
 GEO. H. FAY,
 F. D. RAMSAY.